Patented Apr. 14, 1953

2,635,101

UNITED STATES PATENT OFFICE 2,635,101

6 - THIA - 5,6,7,8 - TETRAHYDRO - 4 - QUINAZOLINOL DERIVATIVES SUBSTITUTED IN THE 2-POSITION

Kurt Rorig, Chicago, Ill., assignor to G. D. Searle & Co., Chicago, Ill., a corporation of Illinois No Drawing. Application February 23, 1952, Serial No. 273,140

12 Claims. (Cl. 260—251)

The present invention relates to a new type of organic heterocycle, that of the 6-thia-5,6,7,8-tetrahydroquinazolines. More particularly, this invention pertains to the condensation of lower alkyl esters of 4-oxotetrahydrothiapyran-3-carboxylic acid with amidines of the type

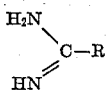

to form 6-thia-5,6,7,8-tetrahydro-4-quinazolinols which can be represented by the structural formula

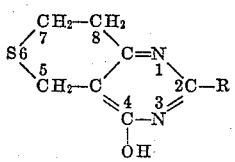

wherein R is a member of the class consisting of amino, hydroxyl, mercapto and lower alkylmercapto radicals, and hydrocarbon radicals containing 1 to 10 carbon atoms.

In the foregoing structural formula R can represent such lower alkyl radicals as methyl, ethyl, straight and branched-chain butyl, amyl, and hexyl as well as such lower aromatic radicals as phenyl, tolyl, xylyl, naphthyl, benzyl and phenethyl. It can also represent lower alkylmercapto radicals such as methylmercapto, ethylmercapto, propylmercapto, and butylmercapto as well as unsubstituted amino, hydroxy, and mercapto radicals.

The compounds which constitute this invention are useful as intermediates in organic synthesis. Thus the 2-amino-6-thia-5,6,7,8-tetrahydro-4-quinazolinol can be alkylated on the amino radical. Further it is possible to replace the hydroxyl radical by halogens. The hydrogen of the hydroxyl radical can also be replaced by an equivalent of a metallic cation and the corresponding salt reacted with a lower alkyl halide such as ethyl iodide to form the corresponding 2-amino-4-alkoxy-6-thia-5,6,7,8 - tetrahydroquinazoline. Arylamino radicals can be conveniently introduced into the 2-position by reacting a lower alkylmercaptide, such as the methylmercapto derivative of Example 3, with a compound such as chloroaniline to produce 2-p-chloroanilino-6-thia-5,6,7,8-tetrahydro-4-quinazolinol.

The compounds which constitute this invention the not only valuable intermediates in chemical syntheses, but are also valuable in themselves as medicinal agents, particularly because of their desirable effect on the cardiovascular system as coronary dilators and diuretics. They have also medicinal utility as internal parasiticides. In the case of the 2-amino derivatives, it has been found preferable for medicinal use to employ the salts which these bases form with inorganic and strong organic acids such as hydrochloric, hydrobromic, sulfuric, phosphoric, sulfamic, citric, oxalic, ascorbic and related acids.

The compounds which constitute this invention are formed by the condensation of lower alkyl esters of 4-oxotetrahydrothiapyran-3-carboxylic acid with amidines of the type

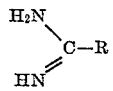

R being defined as hereinabove. As the examples will show, this reaction occurs in many instances very quickly in the presence of alkaline condensing agents such as sodium hydroxide, sodium methoxide, sodium ethoxide and the like. In some cases it was found necessary to heat the mixture at reflux temperature in a solvent such as a lower alkanol. These 6-thia-5,6,7,8-tetrahydro-4-quinazolinol derivatives are usually obtained as colorless, relatively high melting crystals which tend to decompose on heating to fusion temperatures.

The following examples illustrate in detail certain of the compounds which constitute this invention and methods for their preparation. However, the invention is not to be construed as limited thereby in spirit or in scope. It will be apparent to those skilled in the art that many modifications in materials and methods may be made without departing from the invention. In these examples temperatures are given in degrees centigrade (° C.) and relative amounts of materials in parts by weight.

*Example 1*

A solution of 324 parts of guanidine hydrochloride in 2400 parts of absolute ethanol is mixed with a solution of 216 parts of sodium methoxide in 2400 parts of absolute ethanol and the resulting precipitate of sodium chloride is removed by filtration. To the filtrate 600 parts of the ethyl ester of 4-oxotetrahydrothiapyran-3-carboxylic acid are added. Within a few minutes crystals precipitate and, after standing for about an hour, the precipitate is collected on a filter and washed with ethanol. There is thus obtained the monohydrate of 2-amino-6-thia-5,6,7,8-tetrahydro-4-quinazolinol. The crystals are relatively insoluble in water, though they can be satisfactorily recrystallized from a large quantity of water.

They are insoluble in hot ethanol, benzene, acetone, carbon disulfide, chloroform, dioxane and ether.

To a suspension of 200 parts of 2-amino-6-thia-5,6,7,8-tetrahydro-4-quinazolinol in 2700 parts of absolute ethanol is added a sufficient amount of a 25% solution of anhydrous hydrogen chloride in isopropanol to render the suspension acid. By heating complete solution is effected, but on standing the crystalline hydrochloride precipitates, which is collected on a filter and dried. Recrystallized from water this salt melts at about 322–324° C. with decomposition. On treatment with silver nitrate in water a crystalline silver salt is obtained. The hydrochloride has the structural formula

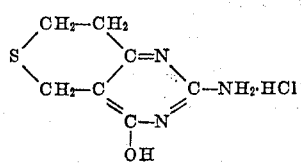

Example 2

To a solution of 32 parts of sodium in 700 parts of methanol are added 43 parts of thiourea and 100 parts of the ethyl ester of 4-oxotetrahydrothiapyran-3-carboxylic acid. This mixture is heated in a sealed tube at 100° C. for 5 hours and then evaporated to dryness under vacuum. The residue is dissolved in water, stirred with charcoal and filtered. Upon acidification of the filtrate with acetic acid a precipitate is obtained which is collected on a filter, washed with water, dried and recrystallized from β-ethoxyethanol. The 2 - mercapto - 6 - thia - 5,6,7,8 - tetrahydro-4-quinazolinol is obtained in colorless crystals which have the structural formula shown below.

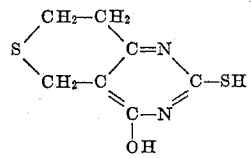

Treatment of 100 parts of this material in 250 parts of potassium hydroxide by gradual addition of 75 parts of methyl sulfate yields the 2-methylmercapto compound in colorless needles which is identical with the product of Example 3.

Example 3

To a solution of 30 parts of S-methylisothiourea sulfate and 15 parts of potassium hydroxide in 200 parts of water there are added 37 parts of the methyl ester of 4-oxotetrahydrothiapyran-3-carboxylic acid. The ester dissolves at once and a solid precipitates within a short time. After standing for 12 hours the precipitate is collected on a filter and washed with water. The precipitate is then dissolved in sodium hydroxide solution and the solution is stirred with charcoal, filtered and acidified with acetic acid. The precipitate is collected on a filter, dried and recrystalized from β-ethoxyethanol and then from ethanol yielding the 2-methylmercapto-6-thia-5,6,7,8-tetrahydro-4-quinazolinol in white needles which have the structural formula

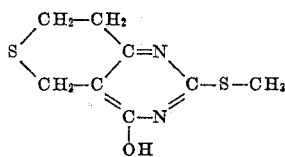

Example 4

A solution of 206 parts of urea in 2500 parts of absolute ethanol is treated with a solution of 274 parts of sodium ethoxide in 2500 parts of ethanol and then with 600 parts of the ethyl ether of 4-oxotetrahydrothiapyran-3-carboxylic acid and heated at reflux temperature for 12 hours. After standing at room temperature the precipitate is collected on a filter, dissolved in water, stirred with decolorizing charcoal and filtered. The filtrate is acidified with hydrochloric acid and the precipitate is collected on a filter, washed with water and dried. Upon crystallization from β-ethoxyethanol the 6-thia-5,6,7,8-tetrahydro-2,4-quinazolinediol is obtained in the form of colorless plates. It has the structural formula

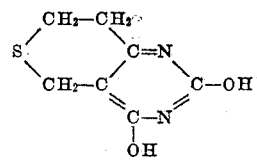

Example 5

A solution of 66 parts of acetamidine hydrochloride in 500 parts of absolute ethanol is stirred with a solution of 55 parts of sodium ethoxide in 500 parts of ethanol and the precipitate of sodium chloride is removed on a filter. To the filtrate 120 parts of the ethyl ester of 4-oxytetrahydrothiapyran-3-carboxylic acid are added and the solution is permitted to stand at room temperature for 5 hours. The resulting precipitate is collected on a filter, washed with ethanol and recrystallized from a large volume of water, using charcoal for decolorization. There are formed colorless needles of the 2-methyl-6-thia-5,6,7,8-tetrahydro-4-quinazolinol which has the structural formula

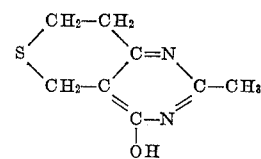

Example 6

A solution of 525 parts of benzamidine hydrochloride in 3000 parts of absolute ethanol is stirred with a solution of 274 parts of sodium ethoxide in 2500 parts of ethanol. The resulting precipitate of sodium chloride is removed by filtration and the filtrate is treated with 550 parts of the methyl ester of 4-oxotetrahydrothiapyran-3-carboxylic acid. Crystallization occurs within 15 minutes and, after standing at room temperature for several hours, the precipitate is collected on a filter and washed with ethanol. Upon recrystallization from a large volume of water and charcoal decolorization the 2-phenyl-6-thia-5,6,7,8-tetrahydro-4-quinazolinol is obtained in white, shining colorless prisms. It has the structural formula

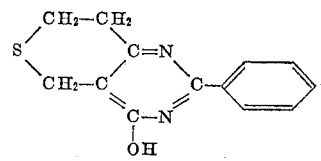

I claim:
1. The 6-thia-5,6,7,8-tetrahydro-4-quinazolinol derivatives of the structural formula

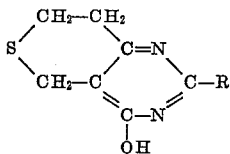

wherein R is a member of the class consisting of amino, hydroxyl, mercapto, lower alkylmercapto, lower alkyl radicals and aromatic hydrocarbon radicals containing 6 to 10 carbon atoms.

2. 2-amino-6-thia-5,6,7,8-tetrahydro-4-quinazolinol of the structural formula

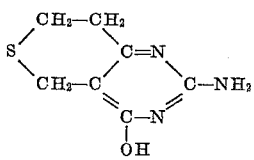

3. The 2-aryl-6-thia-5,6,7,8-tetrahydro-4-quinazolinol of the structural formula

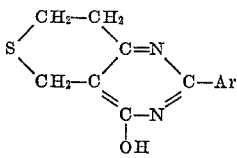

wherein Ar is an aromatic hydrocarbon radical containing 6 to 10 carbon atoms.

4. 2-phenyl-6-thia-5,6,7,8-tetrahydro-4-quinazolinol.

5. A 2-(lower alkyl)-6-thia-5,6,7,8-tetrahydro-4-quinazolinol.

6. 2-methyl-6-thia-5,6,7,8-tetrahydro-4-quinazolinol.

7. 2-mercapto-6-thia-5,6,7,8-tetrahydro-4-quinazolinol.

8. A 2-(lower alkylmercapto)-6-thia-5,6,7,8-tetrahydro-4-quinazolinol.

9. 2-methylmercapto-6-thia-5,6,7,8-tetrahydro-4-quinazolinol.

10. 6-thia-5,6,7,8-tetrahydro-2,4-quinazolinediol.

11. The process of preparing the 6-thia-5,6,7,8-tetrahydro-4-quinazolinol derivatives of the structural formula

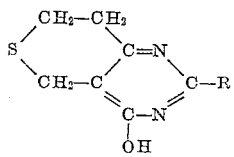

which comprises the condensation of a lower alkyl ester of 4-oxotetrahydrothiapyran-3-carboxylic acid with an amidine of the structural formula $$H_2N-C(=NH)-R$$

wherein R is a member of the class consisting of amino, hydroxyl, mercapto, lower alkylmercapto, lower alkyl radicals and aromatic hydrocarbon radicals containing 6 to 10 carbon atoms.

12. The process of preparing 2-amino-6-thia-5,6,7,8-tetrahydro-4-quinazolinol which comprises condensing a lower alkyl ester of 4-oxotetrahydrothiapyran-3-carboxylic acid with guanidine.

KURT RORIG

No references cited.